United States Patent
Ito et al.

(10) Patent No.: US 9,639,081 B2
(45) Date of Patent: May 2, 2017

(54) SYSTEM FOR MONITORING LOOMS IN WEAVING MILL

(71) Applicant: KABUSHIKI KAISHA TOYOTA JIDOSHOKKI, Kariya-shi, Aichi-ken (JP)

(72) Inventors: Daisuke Ito, Kariya (JP); Taijirou Okuda, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 464 days.

(21) Appl. No.: 14/468,612

(22) Filed: Aug. 26, 2014

(65) Prior Publication Data
US 2015/0066186 A1  Mar. 5, 2015

(30) Foreign Application Priority Data
Aug. 28, 2013 (JP) .................. 2013-176171

(51) Int. Cl.
| | |
|---|---|
| G05B 19/418 | (2006.01) |
| H04L 29/12 | (2006.01) |
| G06F 3/0481 | (2013.01) |
| H04L 12/26 | (2006.01) |
| H04L 12/24 | (2006.01) |

(Continued)

(52) U.S. Cl.
CPC ........ G05B 19/41855 (2013.01); D03J 1/006 (2013.01); G05B 19/0421 (2013.01); G06F 3/04817 (2013.01); H04L 41/0876 (2013.01); H04L 43/08 (2013.01); H04L 61/2015 (2013.01); H04L 61/609 (2013.01);
(Continued)

(58) Field of Classification Search
CPC .......... G05B 19/41855; G05B 19/0421; G05B 2219/21042; G05B 2219/2634; H04L 61/2015; H04L 43/08; H04L 61/609; H04L 41/0876; G06F 3/04817; D03J 1/006
See application file for complete search history.

(56) References Cited

U.S. PATENT DOCUMENTS

2006/0288071 A1* 12/2006 Bigioi ................. H04L 12/2803
                                                                        709/203
2008/0008191 A1* 1/2008 Eguchi ............... H04L 61/2015
                                                                        370/397
(Continued)

FOREIGN PATENT DOCUMENTS

JP    2005-301916 A    10/2005

*Primary Examiner* — Charles C Jiang
*Assistant Examiner* — Oussama Roudani
(74) *Attorney, Agent, or Firm* — Sughrue Mion, PLLC

(57) ABSTRACT

A loom monitoring system includes loom computers and a host computer connected to the loom computers through a network. Each loom computer acquires a temporary IP address from a DHCP server when a fixed IP address is not set for the loom computer and requests the host computer to transmit a fixed IP address using the temporary IP address. The host computer assigns a fixed IP address to the loom computer that transmitted the assignment request signal and correlates the fixed IP address with a loom layout map. The loom computers each transmit an acquisition completion signal to the host computer using the fixed IP address in a designated order based on the loom layout map. The host computer correlates the fixed IP address of each loom computer with the loom layout map in accordance with the designated order.

8 Claims, 2 Drawing Sheets

(51) Int. Cl.
*G05B 19/042* (2006.01)
*D03J 1/00* (2006.01)
(52) U.S. Cl.
CPC .............. *G05B 2219/21042* (2013.01); *G05B 2219/2634* (2013.01)

(56) References Cited

U.S. PATENT DOCUMENTS

| | | | |
|---|---|---|---|
| 2010/0033573 A1* | 2/2010 | Malinovski | G08B 13/19656 348/158 |
| 2011/0099252 A1* | 4/2011 | Jose | H04L 61/2015 709/220 |
| 2011/0283199 A1* | 11/2011 | Schuch | H04L 41/22 715/740 |

* cited by examiner

SYSTEM FOR MONITORING LOOMS IN WEAVING MILL

CROSS-REFERENCE TO RELATED APPLICATIONS

This application is based upon and claims the benefit of priority from prior Japanese Patent Application No. 2013-176171, filed on Aug. 28, 2013, the entire contents of which are incorporated herein by reference.

FIELD

The present invention relates to a system for monitoring looms in a weaving mill.

BACKGROUND

Japanese Laid-Open Patent Publication No. 2005-301916 discloses a manufacturing system that includes a central control computer, which is located in a central control room, and loom computers connected to the central control computer through a network. The loom computers and the central control computer each include a central processing unit (CPU), a memory, an input unit, a display, and external memory, a storage medium drive, a network interface.

The network may be a local area network (LAN), for example. The loom computers and the central control computer communicate through the network to transmit and receive control data and operation data. To communicate through the network, communication addresses are assigned to the loom computers and the central control computer.

Although not described in detail in the '916 publication, when the system uses a TCP/IP network, a unique IP address serving as a communication address has to be assigned and set to each loom computer. Thus, when the network is formed in a weaving mill, a unique IP address has to be set to each of the looms installed in the weaving mill. Setting the IP addresses in the weaving mill is performed manually by an operator. For example, an operator manually inputs and sets an IP address to each of the loom computers while referring to a printout of an IP address list obtained from the central control computer.

The central control computer is configured to generate and store a loom layout map indicating the layout of the looms in the weaving mill. To accurately transfer data between the central control computer and the loom computers, the operator needs to correlate the IP address set for each loom computer with the loom layout map stored in the central control computer.

In the manufacturing system disclosed in the '916 publication, the operator needs to manually and accurately input the IP address for each loom computer while referring to the IP address list. The operator also needs to correctly correlate the IP address of each loom with the loom layout map of the central control computer. The operator refers to the printed IP address list to check the IP address that is to be input and correctly input the IP address to each loom computer. When there are many looms, such a task consumes time and manpower. Further, when an IP address is erroneously input, the operator would have to correct the error.

SUMMARY

It is an object of the present invention to provide a system that facilitates the setting of fixed IP addresses for loom computers and allows the fixed IP addresses to be easily correlated with a loom layout map of a host computer.

One aspect of the present invention is a loom monitoring system including loom computers respectively coupled to looms installed in a weaving mill and a host computer connected to the loom computers through a network. The host computer is configured to communicate with the loom computers to manage the loom computers. A dynamic host configuration protocol (DHCP) server is arranged in the network. The host computer is configured to manage fixed IP addresses to be assigned to the loom computers and store a loom layout map indicating where the looms are located in the weaving mill. Each of the loom computers is configured to transmit, when a fixed IP address is not set for the loom computer, a temporary IP address acquisition request signal to the DHCP server to acquire a temporary IP address from the DHCP server, and transmit a fixed IP address assignment request signal to the host computer using the acquired temporary IP address. The host computer is configured to assign fixed IP addresses to the loom computers that transmitted the assignment request signal, and shift to a correlating mode when the assignment of the fixed IP addresses to the loom computers that transmitted the assignment request signal is completed. The host computer in the correlating mode correlates the fixed IP addresses assigned to the loom computers that transmitted the assignment request signal with the loom layout map. The host computer is configured to request each of the loom computers that transmitted the assignment request signal to transmit an acquisition completion signal so that the acquisition signal is transmitted from the loom computers in a designated order based on the loom layout map. Each loom computer is configured to register the assigned fixed IP address in lieu of the temporary IP address, transmit the acquisition completion signal to the host computer using the fixed IP address when the acquisition completion switch of the loom computer is operated in the designated order based on the loom layout map. The host computer is configured to, when receiving the acquisition completion signals, store and correlate the fixed IP addresses of the loom computers with the loom layout map in accordance with the designated order.

The aspect of the present invention eliminates the need to manually and directly input IP addresses to the host computer and the loom computers in a weaving mill, facilitates the setting of fixed IP addresses for the loom computers, and allows the fixed IP addresses to be easily correlated with the loom layout map of the host computer. Thus, for example, an operator who does not have sophisticated knowledge of the network system may easily correlate the fixed IP address of each loom with the loom layout map.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

Figure 1:
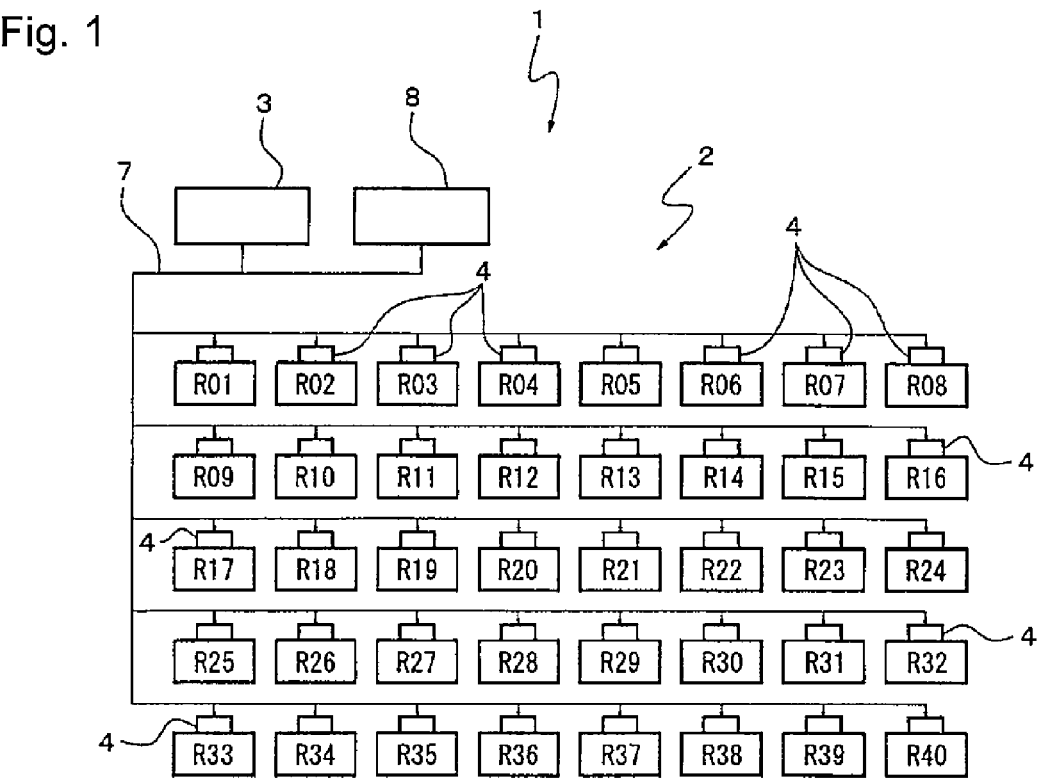
FIG. 1 is a block diagram showing a first embodiment of a monitoring system.

A first embodiment will now be described with reference to FIGS. 1 to 3. FIG. 1 shows a monitoring system 2 that is used in a weaving mill 1. In the weaving mill 1 shown in FIG. 1, for example, a rectangular array of a total of forty looms R01 to R40 are arranged in five rows with eight looms in each row. A host computer (hereafter referred to as the host PC) 3 is located in, for example, a central control room of the weaving mill 1. A loom computer (hereafter referred to as the loom PC) 4 is coupled to each of the looms R01 to R40. Each loom PC 4 is configured to control and manage the operation of the corresponding loom. Each of the host PC 3 and the loom PCs 4 may include, for example, a central processing unit (CPU), a memory, an input/output unit, and a network interface. The host PC may include a display 5 (refer to FIG. 2). Each loom PC 4 may include a display 6 (refer to FIG. 3).

The host PC 3 and each loom PC 4 are wire-connected or wireless-connected to form a network 7. A dynamic host configuration protocol (DHCP) server 8 is arranged in the network 7. The DHCP server 8 is configured to automatically issue temporary IP addresses to the loom PCs 4 connected to the network 7. In the illustrated embodiment, the DHCP server 8 is a discrete node separate from the host PC 3 but may be incorporated in the host PC 3 in other embodiments. In the illustrated embodiment, the network 7 is a TCP/IP network, and a unique IP address is set for the host PC 3.

The host PC 3 stores and manages fixed IP addresses. The host PC 3 is configured to assign a single fixed IP address to a single loom PC 4 upon request. The host PC 3 is configured to generate and store a loom layout map 9 (refer to FIG. 2). The loom layout map 9 shows where the looms R01 to R40 are located in the weaving mill 1 on the display 5 using loom identification numbers (e.g., R01 to R40). The host PC 3 formats the loom layout map 9 so that it can be shown on the display 5. Each of the looms R01 to R40 may be indicated by a graphical icon provided with the loom identification number on the display 5.

A process for assigning a unique IP address to each of the looms R01 to R40 will now be described. The looms R01 to R40 are installed in the weaving mill 1. When the installation of the looms R01 to R40 is completed, an operator pushes a power button (not shown) of one of the looms R01 to R40 (e.g., loom R01). Each loom PC 4 is initialized when the corresponding loom is installed in the weaving mill 1, and a unique IP address is not set for each loom PC 4. Accordingly, when the power goes on, the loom PC 4 of the loom R01 transmits a temporary IP address acquisition request signal to the DHCP server 8, automatically acquires a temporary IP address from the DHCP server 8, and sets the temporary IP address to the loom PC 4 of the loom R01. In some embodiments, the loom PC 4 may be configured to transmit the temporary IP address acquisition request signal when a switch is operated after the power button is pushed. Upon acquisition of the temporary IP address, the loom PC 4 becomes capable of communicating over the network 7. The temporary IP address assigned by the DHCP server 8 is valid for only a certain time. For example, the temporary IP address acquired by a loom PC 4 is automatically deleted or invalidated when the power goes off in the corresponding loom.

The loom PC 4 of the loom R01 uses the acquired temporary IP address to communicate with the host PC 3 over the network 7. The loom PC 4 transmits a fixed IP address assignment request signal. Then, the host PC 3 assigns and transmits a fixed IP address to the loom PC 4 of the loom R01, which transmitted the assignment request signal. The loom PC 4 of the loom R01 receives the assigned fixed IP address and registers the fixed IP address. The temporary IP address set for the loom PC 4 may be replaced by the fixed IP address. The fixed IP address is set to the loom PC 4 as a unique IP address managed by the host PC 3.

In the same manner as the loom PC 4 of the loom R01, the loom PC 4 of each of the looms R02 to R40 acquires a temporary IP address from the DHCP server 8 when the corresponding power button is pushed. Further, the loom PC 4 of each of the looms R02 to R40 acquires a fixed IP address from the host PC using the temporary IP address. Then, the loom PC 4 registers the fixed IP address.

The host PC 3 stores a loom layout map 9, which is generated in advance. After the host PC 3 completes the assignment of the fixed IP addresses to the loom PC 4 of every one of the looms R01 to R40, in response to a mode shifting operation performed by the operator, the host PC 3 shifts to a correlating mode to correlate the fixed IP address of each loom PC 4 with the loom layout map 9. The host PC requests each loom PC 4 that transmitted a fixed IP address assignment request signal to transmit a fixed IP address acquisition completion signal. In a certain embodiment, the host PC 3 requests the acquisition completion signal to be transmitted from the loom PCs 4 of the looms R01 to R40 in an order designated by the loom layout map 9, for example, in an order starting from the loom R01 and proceeding in the order of the loom R02, the loom R03, and so on until reaching the loom R40.

Figure 3:
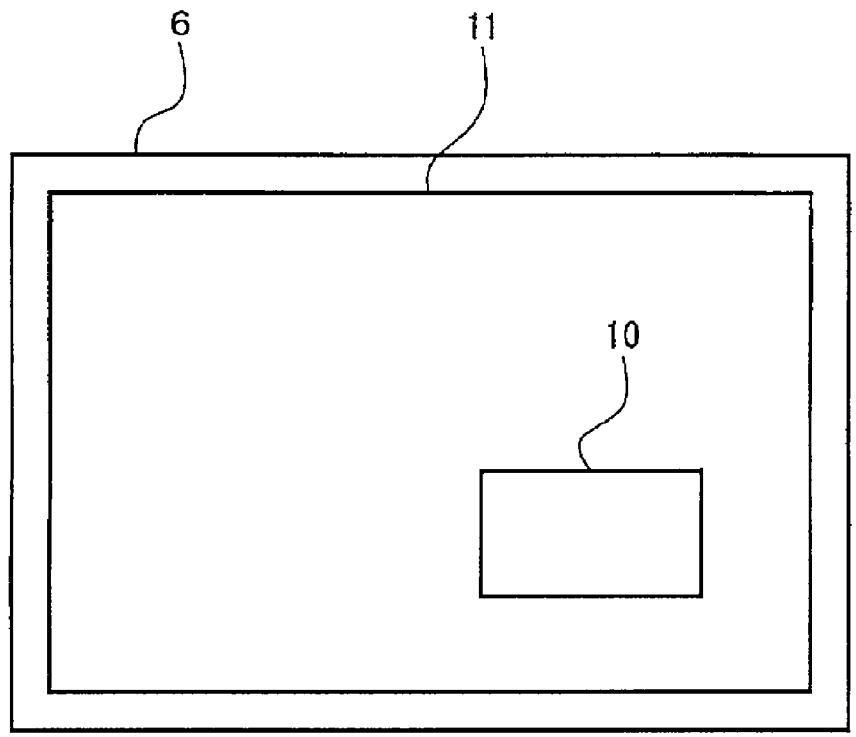
FIG. 3 is a diagram showing a screen image of a fixed IP address acquisition completion switch.

Based on the shift to the correlating mode of the host PC 3 and a request for transmitting a fixed IP address acquisition completion signal provided from the host PC 3 to the loom PCs 4 of the looms R01 to R40, a screen image 11 including an acquisition completion switch 10 illustrated in FIG. 3 is simultaneously shown on the displays 6 of the loom PCs 4 of the looms R01 to R40. A designated transmission order for the acquisition completion signals of the fixed IP addresses may be indicated on a printout of the loom layout map 9 obtained from the host PC 3 or be indicated in the loom layout map 9 that is shown on a tablet terminal.

In accordance with the designated order shown on the loom layout map 9, the operator operates the acquisition completion switch 10, which is shown on the display 6 of each of the looms R01 to R40 in the weaving mill 1. For example, when the operator operates the acquisition completion switch 10 in the screen image 11 shown on the display 6 of the loom R01 that is first designated, the loom PC 4 of the loom R01 communicates using the fixed IP address set for the loom R01 and transmits an acquisition completion signal to the host PC 3.

Figure 2:
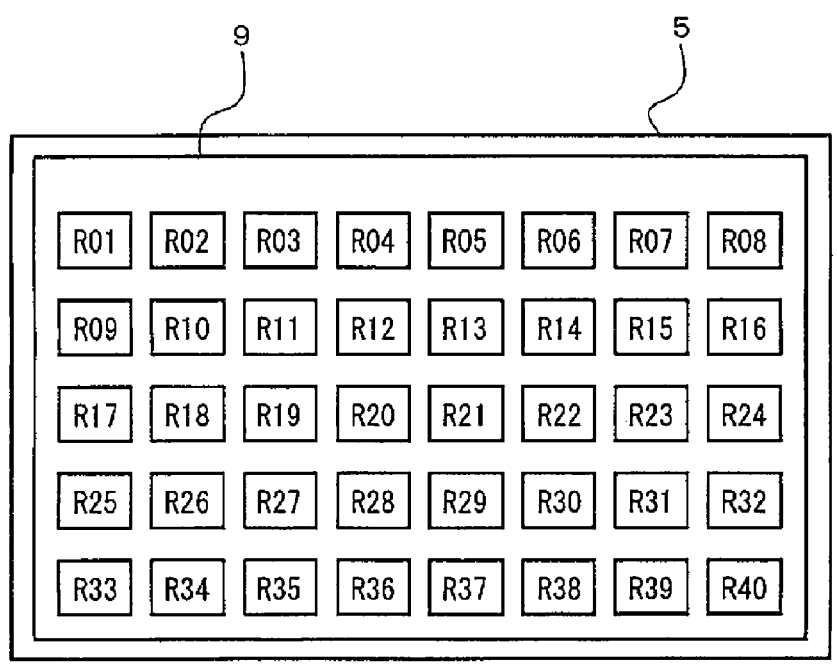
FIG. 2 is a schematic diagram showing a loom layout map.

The host PC 3 receives the acquisition completion signal from the loom R01 and correlates the fixed IP address of the loom R01 with the loom R01 in the loom layout map 9 shown in FIG. 2. Then, the host PC stores the fixed IP address. In the same manner, upon receipt of the acquisition completion signal from each of the looms R02 to R40 in accordance with the designated order, the host PC 3 correlates the fixed IP addresses of the looms R02 to R40 with the looms R01 to R40 in the loom layout map 9 and stores the fixed IP addresses. The process correlating the fixed IP addresses of the looms R01 to R40 with the loom layout map 9 allows the host PC 3 to control the looms R01 to R40 and manage operation data of the looms R01 to R40.

In some embodiments, the host PC 3 may store a layout-address table that correlates the fixed IP addresses of the looms R01 to R40 that transmitted the acquisition completion signal with the corresponding looms R01 to R40 (identification numbers and/or graphical icons) in the loom layout map 9.

When completing the process correlating the fixed IP addresses of the looms R01 to R40 with the loom layout map 9, the operator shifts the host PC 3 to a correlation test mode to test whether or not the correlating process was correctly performed. In the correlation test, when the operator sequentially designates the looms R01 to R40 in the loom layout map 9, the host PC 3 transmits a test signal to the corresponding loom PCs 4. The test signal includes an instruction that instructs each of the looms R01 to R40, which received the test signal, to continuously illuminate a tower lamp as an affirmative response indication. For example, when the operator designates the loom R01 in the loom layout map 9 and the tower lamp of the corresponding loom R01 is continuously illuminated, the operator can determine that the fixed IP address of the loom R01 was correctly correlated with the loom layout map 9. The affirmative response indication of the looms R01 to R40 is not restricted to the continuous illumination of the tower lamp and may be intermittent illumination of the tower lamp, continuous illumination of the tower lamp in a certain color, a graphic indication on the display 6 of the loom PC 4, or a combination of these indications.

In the first embodiment, the operator can set the fixed IP addresses of the looms R01 to R40 and correlate the fixed IP addresses with the loom layout map 9 in the host PC 3 without directly or manually inputting the IP addresses.

In a certain embodiment, after correlating fixed IP addresses with the loom layout map 9, the host PC 3 is configured to receive an input designating a single loom (e.g., R01) in the loom layout map 9 and, in response to the input, transmit a test signal to the corresponding loom PC 4 of the designated loom (e.g., R01). The test signal includes an instruction that instructs the loom (e.g., R01) that received the test signal to generate an affirmative response indication (continuous lamp illumination). In this configuration, the operator may designate a loom (e.g., R01) in the loom layout map 9 to determine whether the loom (e.g., identification number and/or graphical icon) in the loom layout map 9 shown on the host PC 3 has been correctly correlated with a loom actually installed in the weaving mill 1.

In a certain embodiment, when requested for the transmission of the acquisition completion signal by the host PC 3, each loom PC 4 shows the acquisition completion switch 10 on the display 6. In this configuration, when correlating the looms R01 to R40 in the weaving mill 1 with the loom layout map 9 of the host PC 3, the acquisition completion switch 10 is shown on each loom PC 4. This allows the operator to easily find the acquisition completion switch 10.

In a certain embodiment, when assignment of the fixed IP address to the loom layout map 9 has not been completed in a loom (e.g., R01), the loom PC 4 of the loom R01 or the host PC 3 is configured to indicate that assignment has not been completed for the loom R01. In this configuration, the operator can visually recognize the presence of a loom of which the fixed IP address has not been correlated with the loom layout map 9. This prompts the operator to complete the correlation process.

Figure 4:
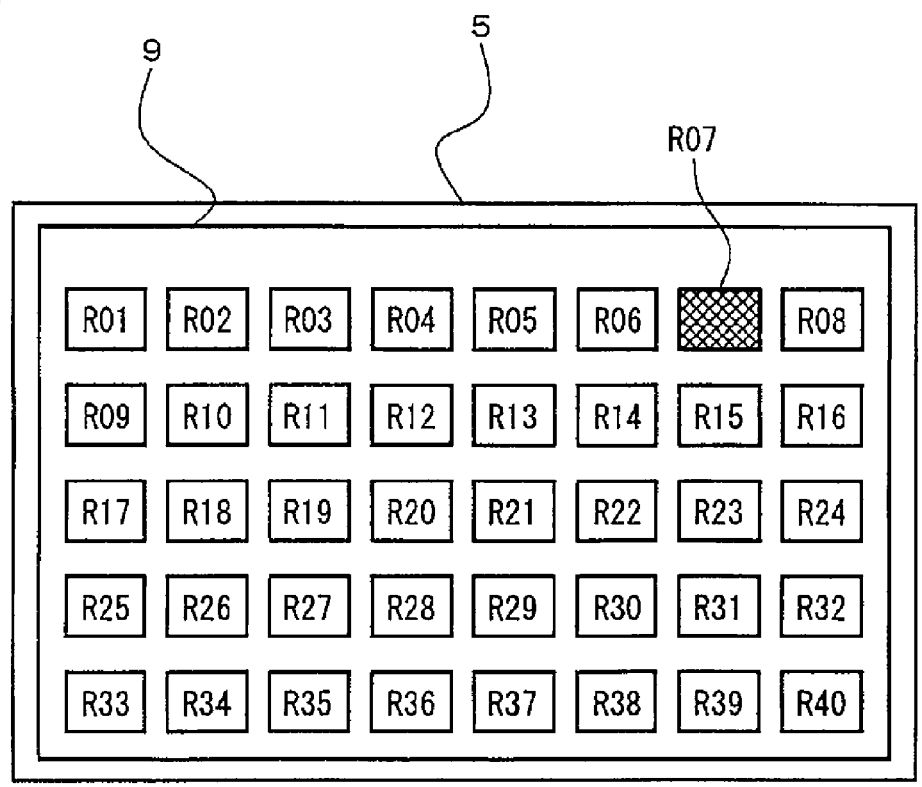
FIG. 4 is a diagram showing a screen image of a loom layout map in a second embodiment.

A second embodiment will now be described with reference to FIG. 4 focusing on differences from the first embodiment.

The looms R01 to R40 are installed and operated in the weaving mill 1. However, some of the looms R01 to R40 may be replaced. Further, the control board of a loom PC4 may be replaced. For example, when the loom PC 4 of the loom R07 becomes defective, the control board of the loom PC 4 may be replaced. Alternatively, the loom R07 may be replaced by a new loom. In such cases, the loom R07 would not have a fixed IP address that is managed by the host PC 3. Thus, the loom R07 cannot communicate with the host PC 3.

The second embodiment is directed to a system configured to facilitate the setting of the fixed IP address and the process for correlating the fixed IP address with the loom layout map 9 when any one of the looms R01 to R40 is changed. The second embodiment will be described using the loom R07 (refer to FIG. 1) in the weaving mill 1 that is correlated with the loom R07 in the loom layout map 9 shown in FIG. 4. The loom R07 may be referred to as a correlated subject loom.

When the loom R07 stops operating and the power is cut off, the control board of the loom PC 4 is replaced by a new control board or the loom R07 is replaced by a new loom. In any of these cases, the loom PC 4 does not have a fixed IP address. If the new loom was operated in another mill, the loom PC 4 of the new loom may have an IP address used for communication in the other mill. In this case, the IP address is deleted.

The host PC 3 shows the loom layout map 9 on the display 5, shifts to the correlating mode, and marks the loom R07 on the loom layout map 9 by coloring or intermittently illuminating the loom R07 to indicate the correlated subject loom. In the loom R07, the power button (not shown) is pushed to activate the loom PC 4 and a temporary IP address is acquired from the DHCP server 8 through the same procedures as the first embodiment. Then, the temporary ID address is used to transmit a fixed IP address assignment request signal to the host PC 3. The host PC 3 receives the assignment request signal, assigns a fixed IP address managed by the host PC 3 to the loom R07, and transmits the fixed IP address to the loom PC 4.

The loom PC 4 of the loom R07 registers and sets the acquired fixed IP address in lieu of the temporary IP address. Then, the fixed IP address acquisition completion switch 10 is shown on the display 6 of the loom PC4 of the correlated subject loom. For example, among a plurality of switches of the loom PC 4, the acquisition completion switch 10 may be shown solely emphasized on the display 6. Alternatively, only the acquisition completion switch 10 may be selectively shown on the display 6. When the operator operates the acquisition completion switch 10, the loom PC 4 transmits an acquisition completion signal to the host PC 3. The loom R07 is marked on the loom layout map 9 of the host PC 3, and the host PC 3 is waiting for the acquisition completion signal from the loom R07. Upon receipt of the acquisition completion signal, the host PC 3 correlates the fixed IP address of the loom R07 that transmitted the acquisition completion signal with the loom R07 in the loom layout map 9 and stores the fixed IP address.

When the process for correlating the fixed IP address is completed, the host PC 3 cancels the marking of the loom R07 in the loom layout map 9. It is preferred that when, for one reason or another, the loom R07 cannot complete the acquisition of the fixed IP address or correlate the fixed IP address with the loom layout map 9, the host PC 3 keeps the loom R07 marked in the loom layout map 9 and indicates on the display 6 of the loom PC 4 of the loom R07 that the correlation has not been completed.

In the second embodiment, when one or more of the looms R01 to R40 is changed from the status quo, a fixed IP address is acquired only for the changed loom, and the fixed IP address is correlated with the loom layout map 9. This facilitates the task for setting the fixed IP address. The operator, for example, performs operations related to only the changed loom but does not perform any operation on looms that remain unchanged. This allows the operator to complete the task for setting the fixed IP address within a short period of time.

It should be apparent to those skilled in the art that the present invention may be embodied in many other specific forms without departing from the spirit or scope of the invention. Particularly, it should be understood that the present invention may be embodied in the following forms.

(1) In the first embodiment, when one of the looms R01 to R40, for example, the loom R10 is replaced with another loom or the loom PC 4 of the loom R10 is initiated, the correlation of the fixed IP address of the loom R10 and the loom layout map 9 is cancelled or invalidated. This disables the management of the loom R10 with the host PC 3. In such a case, it is preferred that the display 6 of the loom PC 4 of the loom R10 or the loom layout map 9 of the host PC 3 indicates that the correlation of the loom R10 and the loom layout map 9 is incomplete.

(2) In the second embodiment, the task for selecting and marking the changed loom in the loom layout map 9 does not have to be performed on the display 5 of the host PC 3 and may be performed using a tablet terminal or the display 5 of the loom PC 4 of a loom adjacent to the changed loom. This would improve convenience since settings such as the correlating process may be performed near the changed loom.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. A loom monitoring system comprising:
    loom computers respectively coupled to looms installed in a weaving mill;
    a host computer connected to the loom computers through a network, wherein the host computer is configured to communicate with the loom computers to manage the loom computers; and
    a dynamic host configuration protocol (DHCP) server arranged in the network;
    wherein the host computer is configured to
        manage fixed IP addresses to be assigned to the loom computers, and
        store a loom layout map indicating where the looms are located in the weaving mill;
    each of the loom computers is configured to
        transmit, when a fixed IP address is not set for the loom computer, a temporary IP address acquisition request signal to the DHCP server to acquire a temporary IP address from the DHCP server, and
        transmit a fixed IP address assignment request signal to the host computer using the acquired temporary IP address;
    the host computer is configured to
        assign fixed IP addresses to the loom computers that transmitted the assignment request signal,
        shift to a correlating mode when the assignment of the fixed IP addresses to the loom computers that transmitted the assignment request signal is completed, wherein the host computer in the correlating mode correlates the fixed IP addresses assigned to the loom computers that transmitted the assignment request signal with the loom layout map, and
        request each of the loom computers that transmitted the assignment request signal to transmit an acquisition completion signal so that the acquisition signals are transmitted from the loom computers in a designated order based on the loom layout map;
    each loom computer is configured to
        register the assigned fixed IP address in lieu of the temporary IP address, and
        transmit the acquisition completion signal to the host computer using the fixed IP address when the acquisition completion switch of the loom computer is operated in the designated order based on the loom layout map;
    the host computer is configured to, when receiving the acquisition completion signals, store and correlate the fixed IP addresses of the loom computers with the loom layout map in accordance with the designated order.

2. The loom monitoring system according to claim 1, wherein
    the host computer receives an input designating one of the looms in the loom layout map after correlating the fixed IP addresses to the loom layout map and transmits a test signal to the loom computer corresponding to the designated loom in response to the input, and
    the test signal includes an instruction for performing a response indication on the loom computer that received the test signal.

3. The loom monitoring system according to claim 1, wherein each of the loom computers is configured to display the acquisition completion switch that is set for the loom computer in accordance with a request for the transmission of the acquisition completion signal by the host computer.

4. The loom monitoring system according to claim 1, wherein when assignment of the fixed IP addresses to the loom layout map has not been completed in a loom, one or both of the loom computer of the loom and the host computer is configured to show that assignment has not been completed for the loom.

5. The monitoring system according to claim 1, wherein when one of the looms installed in the weaving mill is changed, the host computer receives an input designating the changed loom in the loom layout map of the host computer,
in response to the input, the loom computer of the changed loom and the host computer are configured to request for and acquire the fixed IP address, and
the host computer is configured to correlate the fixed IP address of the loom computer of the changed loom with the loom layout map when the acquisition completion switch of the changed loom is operated.

6. The monitoring system according to claim 1, wherein the host computer is configured to store a layout-address table correlating the fixed IP address of each of the looms that transmitted the acquisition completion signal with identification numbers and/or graphical icons of the corresponding looms in the loom layout map.

7. The monitoring system according to claim 6, wherein the host computer is configured to renew the fixed IP address of each of the looms that transmitted the acquisition completion signal and is included in the layout-address table.

8. One or more computer-readable non-transitory storage media having stored thereon instructions that cause a computing system to execute a method, the instructions comprising:
instructions configured to manage, by a host computer, fixed IP addresses to be assigned to loom computers respectively coupled to looms installed in a weaving mill,
instructions configured to store, by the host computer, a loom layout map indicating where the looms are located in the weaving mill;
instructions configured to transmit, by each of the loom computers, a temporary IP address acquisition request signal via a network to a dynamic host configuration protocol (DHCP) server to acquire a temporary IP address from the DHCP server when a fixed IP address is not set for the loom computer;
instructions configured to transmit, by the loom computer that acquires the temporary IP address, a fixed IP address assignment request signal via the network to the host computer using the acquired temporary IP address;
instructions configured to assign, by the host computer, to the loom computer that transmitted the assignment request signal a corresponding fixed IP address;
instructions configured to shift the host computer to a correlating mode when the assignment of the fixed IP address to each of the loom computers that transmitted the assignment request signal is completed, wherein the correlating mode correlates the fixed IP addresses assigned to the loom computers that transmitted the assignment request signal with the loom layout map; and
instructions configured to display an acquisition completion switch on each of the loom computers that transmitted the assignment request signal so that an acquisition signal is transmitted from the loom computers to the host computer in a designated order based on the loom layout map;
instructions configured to, when each of the loom computers that transmitted the assignment request signal registers the assigned fixed IP address in lieu of the temporary IP address and detects an operation to the acquisition completion switch, transmit the acquisition signal from each of the loom computers using the fixed address to the host computer; and
instructions configured to, when the host computer receives the acquisition completion signal, correlate, by the host computer, the fixed IP address of each of the loom computers that transmitted the acquisition completion signal with the loom layout map in accordance with the designated order.

* * * * *